(12) United States Patent
Tomino (10) Patent No.: US 10,627,761 B2
(45) Date of Patent: Apr. 21, 2020

(54) IMAGE FORMING APPARATUS AND METHOD OF DISCHARGE OF DETERIORATED TONER

(71) Applicant: KONICA MINOLTA, INC., Chiyoda-ku, Tokyo (JP)

(72) Inventor: Toshiaki Tomino, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/927,289

(22) Filed: Mar. 21, 2018

(65) Prior Publication Data

US 2018/0275581 A1     Sep. 27, 2018

(30) Foreign Application Priority Data

Mar. 22, 2017     (JP) ................. 2017-055866

(51) Int. Cl.
*G03G 15/00*     (2006.01)
*H04N 1/00*     (2006.01)
*H04N 1/56*     (2006.01)
*G03G 21/14*     (2006.01)

(52) U.S. Cl.
CPC ....... *G03G 15/5062* (2013.01); *G03G 15/556* (2013.01); *G03G 15/652* (2013.01); *G03G 21/14* (2013.01); *H04N 1/0057* (2013.01); *H04N 1/56* (2013.01)

(58) Field of Classification Search
CPC ............. G03G 15/5062; G03G 15/556; G03G 15/652; G03G 21/14; H04N 1/0057; H04N 1/56
See application file for complete search history.

(56) References Cited

U.S. PATENT DOCUMENTS

2015/0071671 A1*     3/2015     Kiuchi ............... G03G 15/5062
399/72

FOREIGN PATENT DOCUMENTS

JP     5741656 B2     7/2015

* cited by examiner

*Primary Examiner* — Iriana Cruz
(74) *Attorney, Agent, or Firm* — Cantor Colburn LLP (57) ABSTRACT

An image forming apparatus includes: an image former that has an image carrier for supporting toner and prints a first image formed by exposure to the image carrier and a developing processing on continuous paper; and a hardware processor that controls the image former so as to print a second image on the continuous paper in a case where information on at least one of coverage and a printing distance of the first image formed by the image former meets a predetermined condition, wherein the hardware processor controls the image former so as to stop forming the second image on the image carrier before a toner amount of the second image per unit width at a predetermined position on the image carrier in a main scanning direction exceeds a threshold value affecting an exposure memory.

11 Claims, 9 Drawing Sheets

IMAGE FORMING APPARATUS AND METHOD OF DISCHARGE OF DETERIORATED TONER

CROSS-REFERENCE TO RELATED APPLICATIONS

The present invention claims priority under 35 U.S.C. § 119 to Japanese Patent Application No. 2017-055866, filed on Mar. 22, 2017, the entire disclosure of which are incorporated herein by reference.

BACKGROUND

Technological Field

The present invention relates to an image forming apparatus for printing an image on continuous paper.

Description of the Related Art

Conventionally, an image forming apparatus such as an electrophotographic printer or copying machine has been widely used. In the image forming apparatus, the image forming processing is generally performed through a series of processes in which an electrostatic latent image is written by irradiating a photosensitive drum, whose surface is uniformly charged, with laser beams by an optical apparatus, the electrostatic latent image is developed with toner in a developing device, thereafter the developed toner image is transferred to a sheet through an intermediate transfer belt, and then the transferred toner image is fixed on the sheet.

Herein, it is known that the toner deteriorates, for example, when the toner is not consumed for a long time. When the toner deteriorates, there is a problem that the electric charge amount of the toner decreases, thereby degrading the image quality. As a countermeasure against this problem, a toner discharge processing is carried out to forcibly discharge the deteriorated toner staying in the developing device to the outside. For example, when an image is formed on each sheet (paper), the deteriorated toner is discharged by forming a belt-like pattern or the like on the intermediate transfer belt at a timing when the image is not formed between sheets.

However, when an image is formed on long continuous paper such as roll paper, there is no region to form the belt-like pattern or the like between the images. Thus, there is a problem that the deteriorated toner cannot be discharged. Thereupon, JP 5741656 B2 describes an image forming apparatus which suppresses the deterioration of toner by promoting the circulation of the toner by forming a predetermined image pattern in a side region of the continuous paper outside the image region so that the area coverage becomes equal to or greater than a predetermined threshold value.

However, the image forming apparatus described in JP 5741656 B2 has the following problems. That is, in the conventional image forming apparatus, when belt-like patterns for the deteriorated toner are continuously printed, an exposure memory may be generated on a photosensitive drum. The exposure memory is a phenomenon in which the potential of the surface of the photosensitive drum when a previously exposed line portion is recharged and the potential of the surface of the photosensitive drum when a portion not previously exposed are different. As a result, there has been a problem that image defects occur in the region of the photosensitive drum where the exposure memory has been generated.

SUMMARY

The present invention has been made in light of the above problems, and an object thereof is to provide an image forming apparatus capable of preventing the occurrence of an exposure memory on a photoreceptor when printing on continuous paper is performed.

To achieve the abovementioned object, according to an aspect of the present invention, an image forming apparatus reflecting one aspect of the present invention comprises: an image former that has an image carrier for supporting toner and prints a first image formed by exposure to the image carrier and a developing processing on continuous paper; and a hardware processor that controls the image former so as to print a second image on the continuous paper in a case where information on at least one of coverage and a printing distance of the first image formed by the image former meets a predetermined condition, wherein the hardware processor controls the image former so as to stop forming the second image on the image carrier before a toner amount of the second image per unit width at a predetermined position on the image carrier in a main scanning direction exceeds a threshold value affecting an exposure memory.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more preferred embodiments of the present invention will be described in detail with reference to the drawings. However, the scope of the invention is not limited to the disclosed embodiments. Moreover, the dimensional ratios of the drawings are exaggerated for convenience of explanation and may differ from the actual ratios.

Configuration Example of Image Forming System 100

Figure 1:
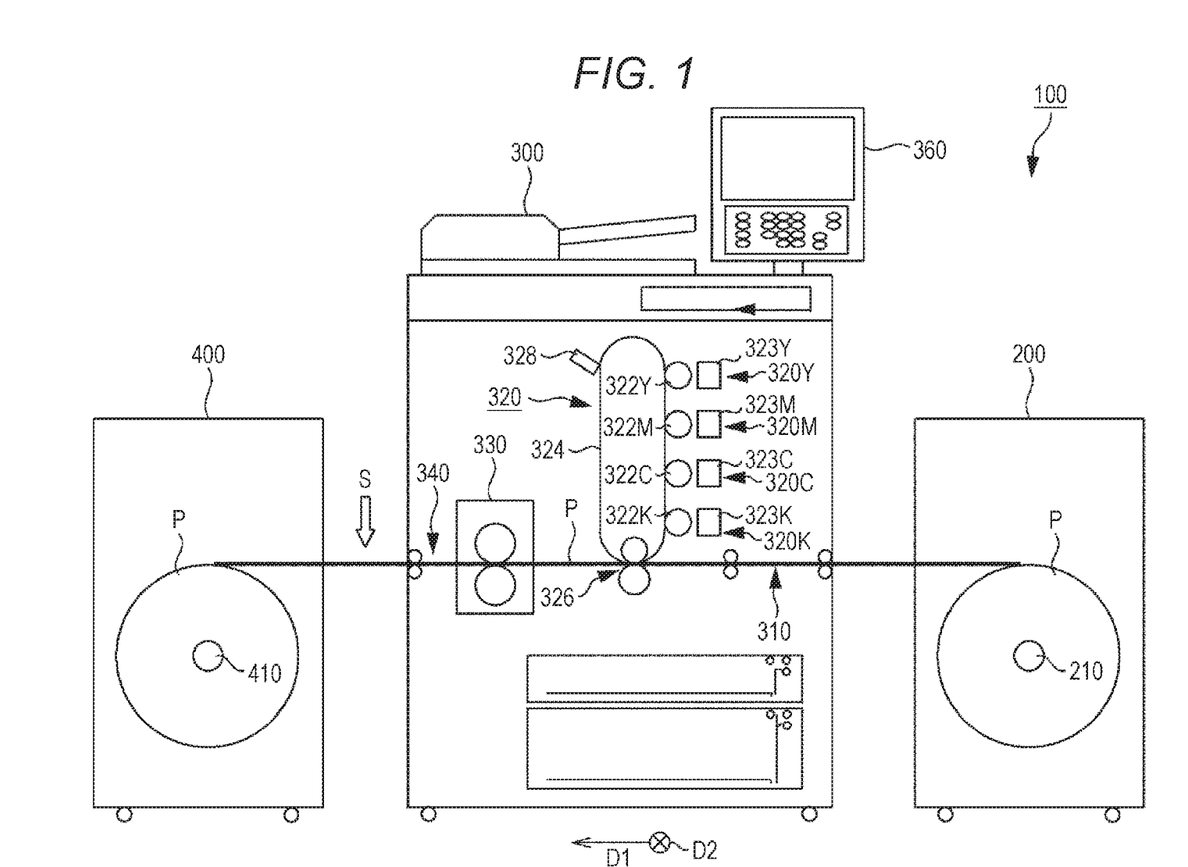
FIG. 1 is a diagram showing a configuration example of an image forming system according to one embodiment of the present invention.

FIG. 1 shows one example of a schematic configuration of an image forming system 100 according to one embodiment of the present invention. As shown in FIG. 1, the image forming system 100 forms an image on continuous paper such as roll paper P and includes a paper feeder 200, an image forming apparatus 300 and a paper discharge apparatus 400.

The paper feeder 200 is disposed on the upstream side of the image forming apparatus 300 in a paper conveying direction D1 and has a mounting portion 210 including a support shaft. The mounting portion 210 rotatably supports the wound roll paper P, and feeds the roll paper P to the image forming apparatus 300 based on a job start instruction. Note that the continuous paper is not necessarily held in a roll form and may be folded. Alternatively, a plurality of pieces of long continuous paper may be used.

The image forming apparatus 300 is a color tandem electrophotographic copying machine and has a fed paper conveying portion 310, an image former 320, a fixing portion 330, a discharge paper conveying portion 340 and an operation display portion 360.

The fed paper conveying portion 310 is constituted by, for example, a plurality of conveying rollers, a drive motor for rotationally driving the conveying rollers, and the like. The fed paper conveying portion 310 conveys the roll paper P fed from the paper feeder 200 to the image former 320 by rotating the plurality of conveying rollers by driving the drive motor.

The image former 320 has a yellow image former 320Y, a magenta image former 320M, a cyan image former 320C, a black image former 320K, an intermediate transfer belt 324 and a secondary transfer portion 326.

The image former 320Y has a photosensitive drum 322Y with a cylindrical shape and an exposure portion 323Y which forms an electrostatic latent image by scanning on the photosensitive drum 322Y, which is charged based on an image signal subjected to a predetermined image processing, with laser beams in a main scanning direction D2 (hereinafter, may be referred to as a width direction). The electrostatic latent image is developed with toner of a developing portion (not shown), and a predetermined image is formed. The main scanning direction D2 is a direction orthogonal to the paper conveying direction D1 and the rotation direction of the photosensitive drum 322. Note that the image formers 320M, 320C and 320K similarly include photosensitive drums, exposure portions and the like and a detailed description thereof will be omitted since the configurations and functions are the same as those of the image former 320Y. In addition, Y, M, C and K may be not affixed to be written unless it is particularly necessary to distinguish.

The toner images of the respective colors formed by the image formers 320Y, 320M, 320C and 320K are superimposed and transferred onto an image forming position of the intermediate transfer belt 324. At the secondary transfer portion 326, the toner images of the respective colors on the intermediate transfer belt 324 are collectively transferred onto the roll paper P conveyed by the fed paper conveying portion 310.

The fixing portion 330 has, for example, a fixing roller, a pressure roller, a fixing belt and the like. The fixing portion 330 fixes the toner images on the surface of the roll paper P by heating and pressurizing the roll paper P on which the toner images have been transferred by the secondary transfer portion 326.

The discharge paper conveying portion 340 is constituted by, for example, a plurality of conveying rollers, a drive motor for rotationally driving the conveying rollers, and the like. The discharge paper conveying portion 340 conveys the roll paper P subjected to the fixing processing by the fixing portion 330 to the subsequent paper discharge apparatus 400 by rotating the plurality of conveying rollers by driving the drive motor.

The operation display portion 360 is constitute by a touch panel in which a display portion and an input portion are combined, and operation keys including a start key, a decision key and the like provided at the peripheral portion of the touch panel. The operation display portion 360 displays an operation screen or the like and accepts various information such as a touch operation on the operation screen or the like and image forming conditions inputted by operating an operation key.

The paper discharge apparatus 400 is disposed on the downstream side of the image forming apparatus 300 in the paper conveying direction D1 and has a winding portion 410 including a support shaft. The winding portion 410 winds up around the support shaft the roll paper P discharged from the discharge paper conveying portion 340 of the image forming apparatus 300. The roll paper P is not necessarily wound in a roll form and can be housed by being cut for each page.

Note that an adjustment apparatus (buffer) may be provided between the paper feeder 200 and the image forming apparatus 300 to absorb the speed difference between the conveying speed of the roll paper P in the paper feeder 200 and the conveying speed of the roll paper P in the image forming apparatus 300, or the like. Moreover, a similar adjustment apparatus may be provided between the image forming apparatus 300 and the paper discharge apparatus 400. Furthermore, an adjustment mechanism may be attached as a unit to the side portion of the image forming apparatus 300 in the vicinity of the conveying portion or the discharging portion. Further, a processing apparatus may be provided between the image forming apparatus 300 and the paper discharge apparatus 400 to cut out a label, laminate or the like the roll paper P on which an image has been printed.

Block Configuration Example of Image Forming Apparatus 300

Figure 2:
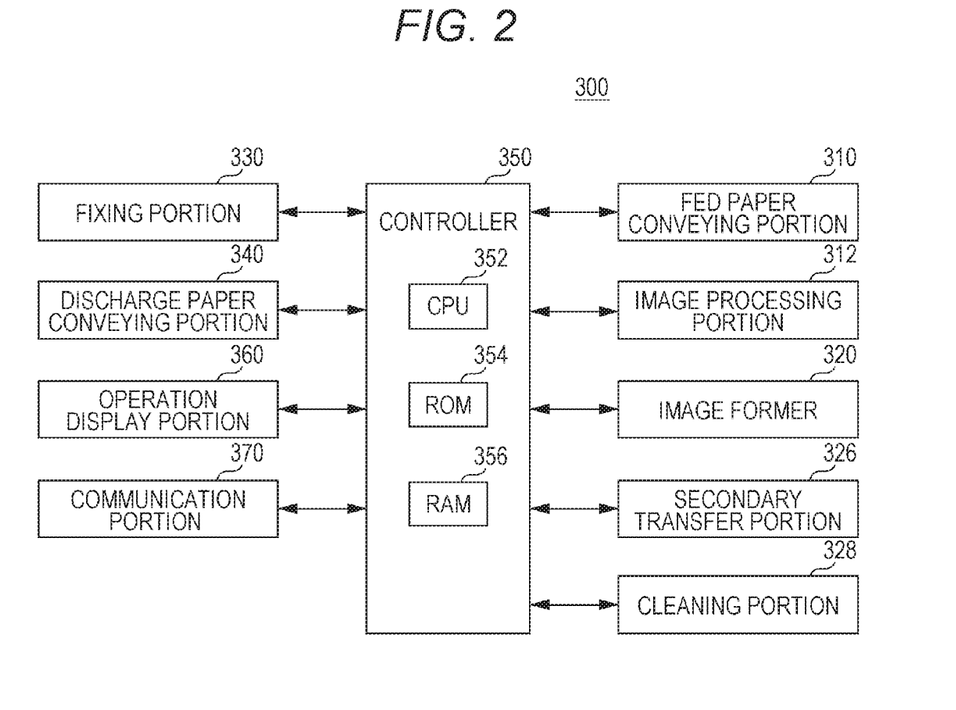
FIG. 2 is a block diagram showing a functional configuration example of an image forming apparatus.

FIG. 2 is a block diagram showing one example of a functional configuration of the image forming apparatus 300 in the image forming system 100 according to the present invention. As shown in FIG. 2, the image forming apparatus 300 includes a controller 350 for controlling the operation of the entire system. The controller 350 has a central processing unit (CPU) 352, a read only memory (ROM) 354 and a random access memory (RAM) 356. The CPU 352 develops and executes software (program) read out from the ROM 354 in the RAM 356, thereby controlling each portion of the image forming apparatus 300 to realize the functions relating to the image formation.

The controller 350 is connected to the fed paper conveying portion 310, an image processing portion 312, the image former 320, the secondary transfer portion 326, a cleaning portion 328, the fixing portion 330, the discharge paper conveying portion 340, the operation display portion 360 and a communication portion 370. The fed paper conveying portion 310, the image processing portion 312, the image former 320, the secondary transfer portion 326, the fixing portion 330, the discharge paper conveying portion 340, the operation display portion 360 and the like execute predetermined processings based on the instructions from the controller 350.

The cleaning portion 328 has a placoid blade and removes an image pattern for discharging the deteriorated toner formed on the intermediate transfer belt 324 by contacting the surface of the intermediate transfer belt 324, and the toner remaining at the time of the image formation.

The communication portion 370 is an interface for communicating with other external apparatuses (e.g., a host apparatus incorporated with a printer driver) via a network such as a local area network (LAN) or a wide area network (WAN). A standard such as Ethernet (registered trademark), Wi-Fi, FDDI or token ring is used for the communication.

At a time of printing an image, the controller 350 prints a belt-like image pattern for discharging the deteriorated toner (hereinafter, referred to as a toner discharge image) in a non-image forming region on the roll paper P when the image has low coverage or when the continuous printing distance exceeds a certain distance. At this time, before the toner amount in the toner discharge image per unit width (predetermined region) in the main scanning direction D2 on the photosensitive drum 322 exceeds an allowable limit value (threshold value) affecting an exposure memory, the controller 350 controls to stop (interrupt) forming the toner discharge image on the photosensitive drum 322.

Herein, the unit width can be defined, for example, based on the circumferential length of one circumference in the rotation direction of the photosensitive drum 322. Moreover, the allowable limit value of the exposure memory is a value indicating a reference of the toner amount, the charge amount or the liker generating the exposure memory and can be defined based on the exposure amount per unit width x exposure time at the photosensitive drum 322 of each color or the toner density x printing distance.

Figure 3:
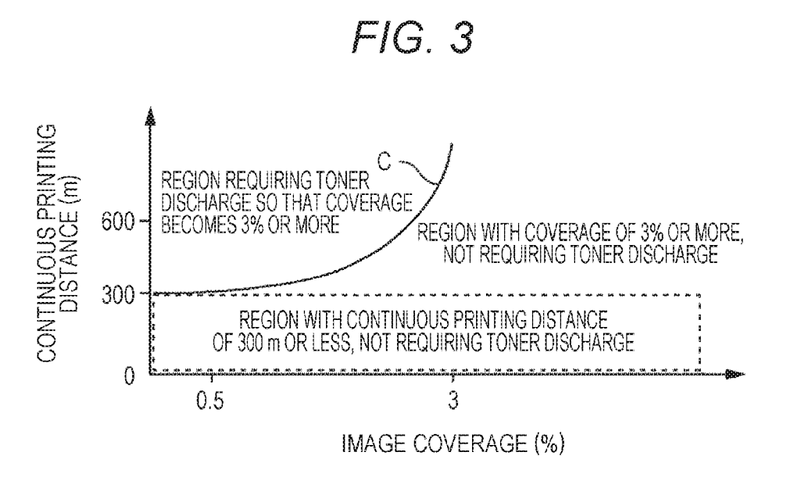
FIG. 3 is a diagram for illustrating the relationship among image coverage and a continuous printing distance and a discharging method of deteriorated toner.

Example of Relationship Among Image Coverage and Continuous Printing Distance and Discharging Method of Deteriorated Toner FIG. 3 is a diagram for illustrating the relationship among image coverage and a continuous printing distance and a discharging method of deteriorated toner. In FIG. 3, the vertical axis represents the continuous printing distance for continuously printing the image, and the horizontal axis represents the image coverage. Note that the image coverage can be detected by a pixel counter or the like or can be acquired from the exposure information of a job.

As shown in FIG. 3, when the continuous printing distance of a job to be executed is 300 m or less (broken line portion), continuous printing is performed without printing (discharging) the toner discharge image on the roll paper P regardless of the image coverage. Note that the continuous printing distance serving as a reference for printing an image pattern RFP on the roll paper P is not limited to 300 m or less. The continuous printing distance can be changed as appropriate according to various parameters such as toner characteristics, usage environment and apparatus characteristics.

A continuous printing threshold curve C is a curve defined based on the continuous printing distance and the image coverage, and whether or not the deteriorated toner is discharged is determined based on this curve as a reference. When a job is in the left side region of the continuous printing threshold curve C and the image coverage is less than 3%, it is necessary to discharge the toner so that the image coverage becomes 3% or more. Therefore, when a job is in this region, the toner discharge image is printed on the roll paper P. That is, the toner discharge image is formed so that the toner discharge amount combined with the toner discharge amount used for the image based on the job becomes equal to or greater than a preset threshold value (e.g., coverage). Note that the toner amount of the toner discharge image can be determined by the length of the toner discharge image in the paper conveying direction D1, the length of the toner discharge image in the width direction D2, and the density of the toner discharge image.

On the other hand, when a job is on the right side of the continuous printing threshold curve C and the image coverage is 3% or more, it is unnecessary to discharge the deteriorated toner. Therefore, when a job is in this region, the toner discharge image is not printed on the roll paper P.

Example of Relationship Between Allowable Limit Value of Exposure Memory and Running Distance of Photosensitive Drum 322

Figure 4:
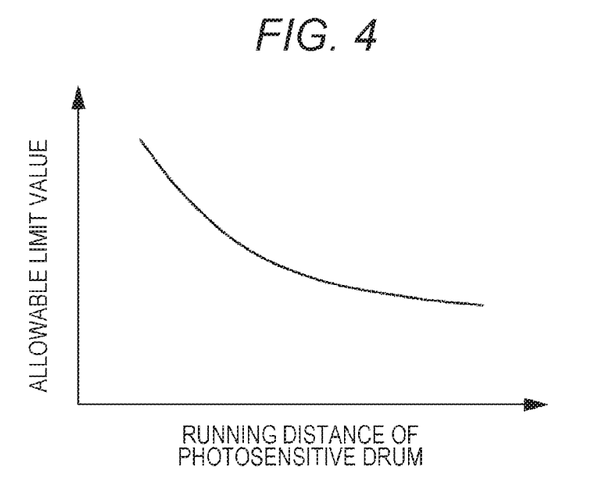
FIG. 4 is a diagram for illustrating the relationship between an allowable limit value of an exposure memory on a photosensitive drum and a running distance of the photosensitive drum.

FIG. 4 shows one example of the relationship between the allowable limit value of the exposure memory on the photosensitive drum 322 and a running distance of the photosensitive drum 322. In FIG. 4, the vertical axis represents the allowable limit value of the exposure memory, and the horizontal axis represents the running distance of the photosensitive drum 322.

As shown in FIG. 4, as the running distance of the photosensitive drum 322 increases, the allowable limit value of the exposure memory on the photosensitive drum 322 decreases in inverse proportion thereto. This is because the destaticizing ability and the like at the photosensitive drum 322 are reduced by aged deterioration or the like due to use of the photosensitive drum 322. Therefore, in the present embodiment, the allowable limit value of the exposure memory is set for each running distance and use time of the photosensitive drum 322, and interruption control (first to fourth printing controls and the like described later) of printing a toner discharge image 20 on the photosensitive drum 322 is executed so that the allowable limit value of the exposure memory is not exceeded, that is, before the allowable limit value is exceeded. Note that it is also possible to provide a table, in which the running distance and the use time of the photosensitive drum 322 are associated with the allowable limit value of the exposure memory, and store this table in advance in the memory.

[About First Printing Control]

Figure 5A:
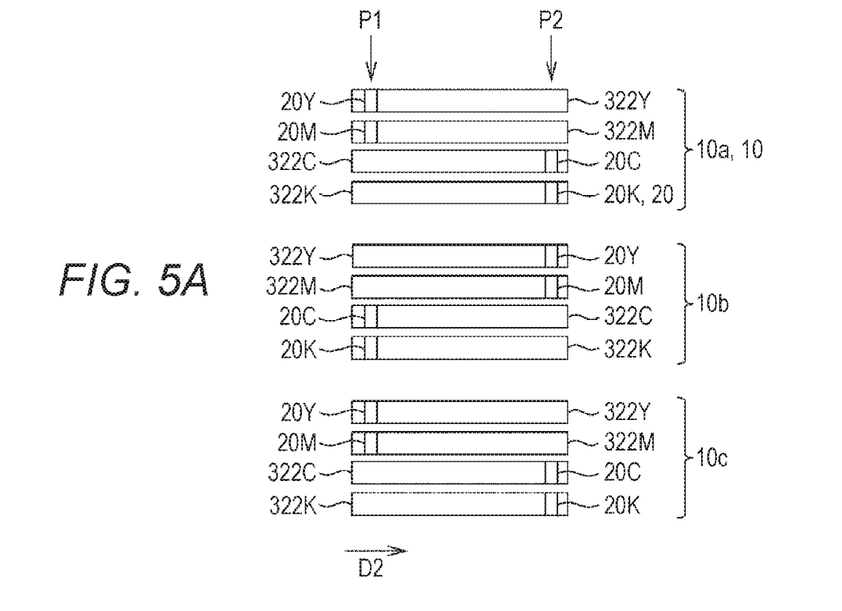
FIG. 5A and FIG. 5B are diagrams for illustrating first printing control for preventing the exposure memory on the photosensitive drum.
Figure 5B:
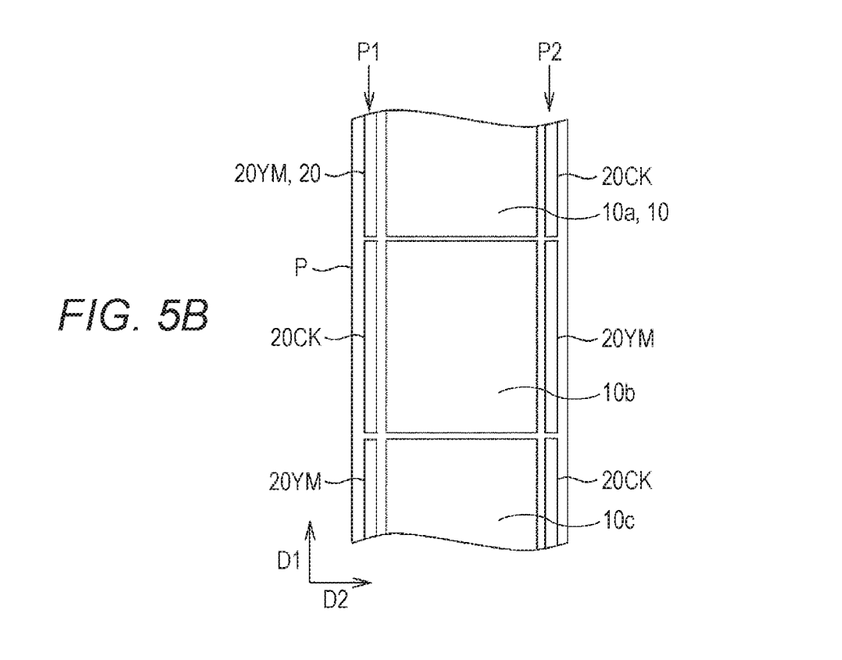

FIG. 5A and FIG. 5B are diagrams for illustrating first printing control for preventing the occurrence of the exposure memory on the photosensitive drums 322Y, 322M, 322C and 322K of the respective colors. Note that, in FIG. 5A, one end of the photosensitive drum 322 in the main scanning direction D2 is defined as an end position (phase) P1, and the other end is defined as an end position (phase) P2. Moreover, in FIG. 5B, the position on the roll paper P corresponding to the end position P1 of the photosensitive drum 322 is also defined as the end position P1, and the position on the roll paper P corresponding to the end position P2 of the photosensitive drum 322 is also defined as the end position P2.

In the first printing control, a toner discharge image 20 constituted by toner images of two colors is printed on one end of the roll paper P, a toner discharge image 20 constituted by toner images of the remaining two colors is printed on the other end of the roll paper P, and the forming position of the toner discharge image 20 on the photosensitive drum 322 is alternately switched at the timing when the printing page of an image 10 of a job is switched. More specifically, the first printing control is as follows.

First, the image forming processing of an image 10a of the first page is started. As shown in FIG. 5A, on each of the photosensitive drums 322Y, 322M, 322C and 322K, the image 10a (not shown) of the first page is developed in an image forming region between the end positions P1 and P2. Furthermore, when the image coverage of the job to be executed is low, a toner discharge image 20Y is developed at the end position P1 on the photosensitive drum 322Y of the Y color. On the photosensitive drum 322M of the M color, a toner discharge image 20M is developed at the end position P1. On the photosensitive drum 322C of the C color, a toner discharge image 20C is developed at the end position P2. On the photosensitive drum 322K of the K color, a toner discharge image 20K is developed at the end position P2.

Subsequently, as shown in FIG. 5B, the image 10a of the first page is printed on the roll paper P. Furthermore, at the end position P1 which is a non-image forming region of the roll paper P, a belt-like toner discharge image 20YM constituted by two layers, the toner discharge image 20Y of the Y color and the toner discharge image 20M of the M color, is printed. At the end position P2 which is a non-image forming region of the roll paper P, a belt-like toner discharge image 20CK constituted by two layers, the toner discharge image 20C of the C color and the toner discharge image 20K of the K color, is printed.

Next, the image printing processing of an image 10b of the second page is started. As shown in FIG. 5A, on each of the photosensitive drums 322Y, 322M, 322C and 322K, the image 10b (not shown) of the second page is developed in an image forming region between the end positions P1 and P2. On the photosensitive drum 322Y of the Y color, a toner discharge image 20Y is developed at the end position P2 different from the end position P1 in the case of the first page. On the photosensitive drum 322M of the M color, a toner discharge image 20M is developed at the end position P2 different from the end position P1 in the case of the first page. On the photosensitive drum 322C of the C color, a toner discharge image 20C is developed at the end position P1 different from the end position P2 in the case of the first page. On the photosensitive drum 322K of the K color, a toner discharge image 20K is developed at the end position P1 different from the end position P2 in the case of the first page.

Subsequently, as shown in FIG. 5B, the image 10b of the second page is printed on the roll paper P. Furthermore, at the end position P1 of the roll paper P, a belt-like toner discharge image 20CK constituted by two layers, the toner discharge image 20C of the C color and the toner discharge image 20K of the K color, is printed. At the end position P2 of the roll paper P, a belt-like toner discharge image 20YM constituted by two layers, the toner discharge image 20Y of the Y color and the toner discharge image 20M of the M color, is printed.

Next, the printing processing of an image 10c of the third page is started. As shown in FIG. 5A, on each of the photosensitive drums 322Y, 322M, 322C and 322K, the image 10c (not shown) of the third page is developed in an image forming region between the end positions P1 and P2. Furthermore, on the photosensitive drum 322Y of the Y color, a toner discharge image 20Y is developed at the end position P1 different from the end position P2 in the case of the second page. On the photosensitive drum 322M of the M color, a toner discharge image 20M is developed at the end position P1 different from the end position P2 in the case of the second page. On the photosensitive drum 322C of the C color, a toner discharge image 20C is developed at the end position P2 different from the end position P1 in the case of the second page. On the photosensitive drum 322K of the K color, a toner discharge image 20K is developed at the end position P2 different from the end position P1 in the case of the second page.

Subsequently, as shown in FIG. 5B, the image 10c of the third page is printed on the roll paper P. Furthermore, at the end position P1 of the roll paper P, a belt-like toner discharge image 20YM constituted by two layers, the toner discharge image 20Y of the Y color and the toner discharge image 20M of the M color, is printed. At the end position P2 of the roll paper P, a belt-like toner discharge image 20CK constituted by two layers, the toner discharge image 20C of the C color and the toner discharge image 20K of the K color, is printed.

[About Second Printing Control]

Figure 6A:
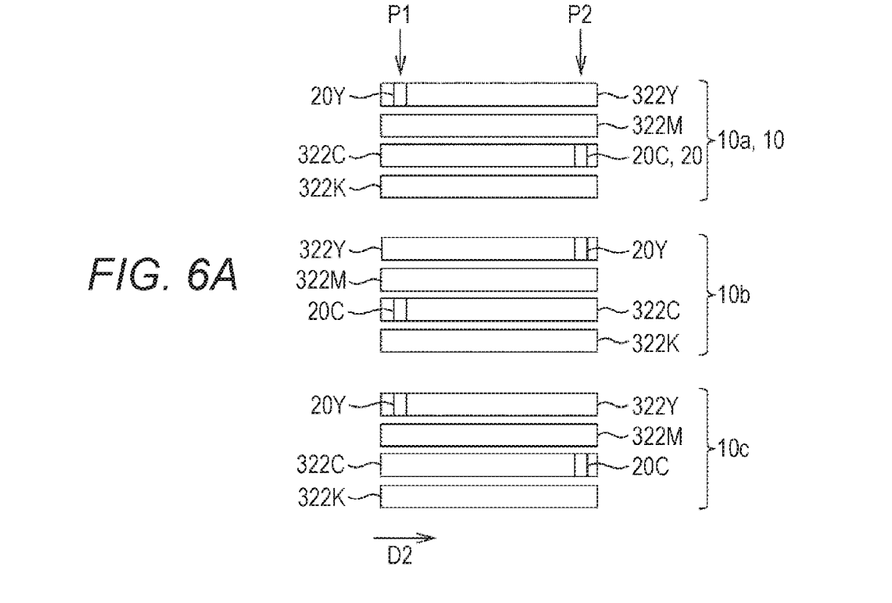
FIG. 6A and FIG. 6B are diagrams for illustrating second printing control for preventing the exposure memory on the photosensitive drum.
Figure 6B:
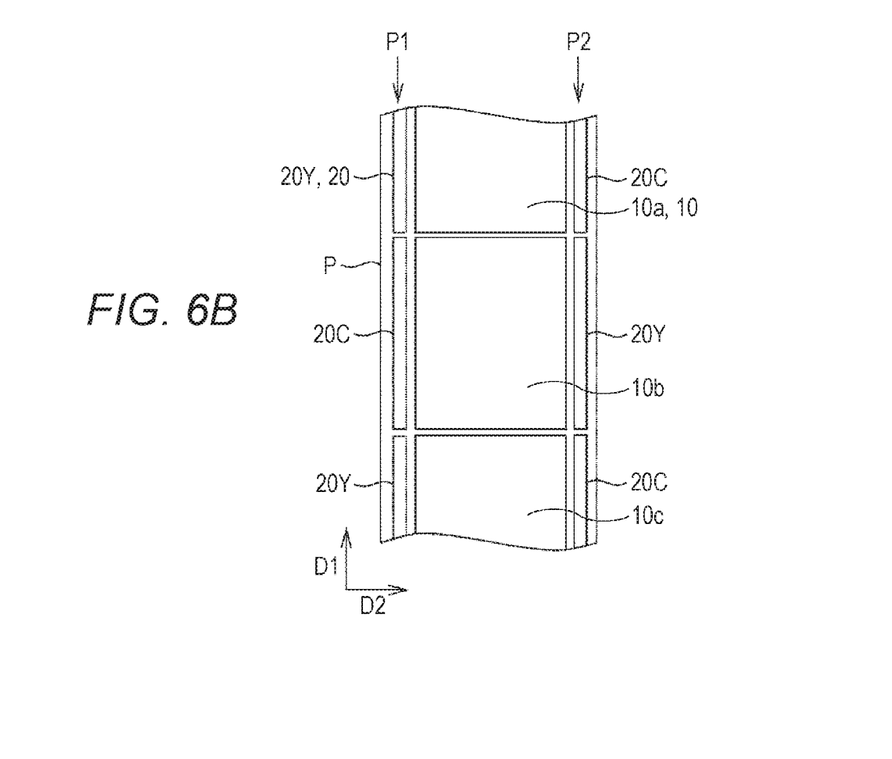

FIG. 6A and FIG. 6B are diagrams for illustrating second printing control for preventing the occurrence of the exposure memory on the photosensitive drums 322Y, 322M, 322C and 322K of the respective colors. Note that, in FIG. 6A, one end of the photosensitive drum 322 in the main scanning direction D2 is defined as an end position P1, and the other end is defined as an end position P2. Moreover, in FIG. 6B, the position on the roll paper P corresponding to the end position P1 of the photosensitive drum 322 is also defined as the end position P1, and the position on the roll paper P corresponding to the end position P2 of the photosensitive drum 322 is also defined as the end position P2.

In the second printing control, a color that is equal to or less than a specified value out of the image coverage of each color of the image 10 to be printed is identified, only a toner discharge image 20 of the identified color is printed on the end of the roll paper P, and the forming position of the toner discharge image 20 on the photosensitive drum 322 is switched at the timing when the printing page of the image 10 of a job is switched. More specifically, the second printing control is as follows. Note that a case where the image coverage of the Y color and C color in the image 10 of a job to be printed is, for example, less than 3% of the specified value will be described hereinafter.

First, the image forming processing of an image 10a of the first page is started. As shown in FIG. 6A, on each of the photosensitive drums 322Y, 322M, 322C and 322K, the image 10a (not shown) of the first page is developed in an image forming region between the end positions P1 and P2. Furthermore, when the image coverage of the Y color and the C color of a job to be executed is low, a toner discharge image 20Y is developed at the end position P1 on the photosensitive drum 322Y of the Y color. On the photosensitive drum 322C of the C color, a toner discharge image 20C is developed at the end position P2.

Subsequently, as shown in FIG. 6B, the image 10a of the first page is printed on the roll paper P. Furthermore, at the end position P1 which is a non-image forming region of the roll paper P, a toner discharge image 20Y of the Y color constituted by one layer is printed. At the end position P2 which is a non-image forming region of the roll paper P, a toner discharge image 20C of the C color constituted by one layer is printed.

Next, the printing processing of an image 10b of the second page is started. As shown in FIG. 6A, on each of the photosensitive drums 322Y, 322M, 322C and 322K, the image 10b (not shown) of the second page is developed in an image forming region between the end positions P1 and P2. Furthermore, on the photosensitive drum 322Y of the Y color, a toner discharge image 20Y is developed at the end position P2 different from the end position P1 in the case of the first page. On the photosensitive drum 322C of the C color, a toner discharge image 20C is developed at the end position P1 different from the end position P2 in the case of the first page.

Subsequently, as shown in FIG. 6B, the image 10b of the second page is printed on the roll paper P. Furthermore, at the end position P1 of the roll paper P, a toner discharge image 20C of the C color constituted by one layer is printed. At the end position P2 of the roll paper P, a toner discharge image 20Y of the Y color constituted by one layer is printed.

Next, the printing processing of an image 10c of the third page is started. As shown in FIG. 6A, on each of the photosensitive drums 322Y, 322M, 322C and 322K, the image 10c (not shown) of the third page is developed in an image forming region between the end positions P1 and P2. Furthermore, on the photosensitive drum 322Y of the Y color, a toner discharge image 20Y is developed at the end position P1 different from the end position P2 in the case of the second page. On the photosensitive drum 322C of the C color, a toner discharge image 20C is developed at the end position P2 different from the end position P1 in the case of the second page.

Subsequently, as shown in FIG. 6B, the image 10c of the third page is printed on the roll paper P. Furthermore, at the end position P1 of the roll paper P, a toner discharge image 20Y of the Y color constituted by one layer is printed. At the end position P2 of the roll paper P, a toner discharge image 20C of the C color constituted by one layer is printed.

[About Third Printing Control]

Figure 7A:
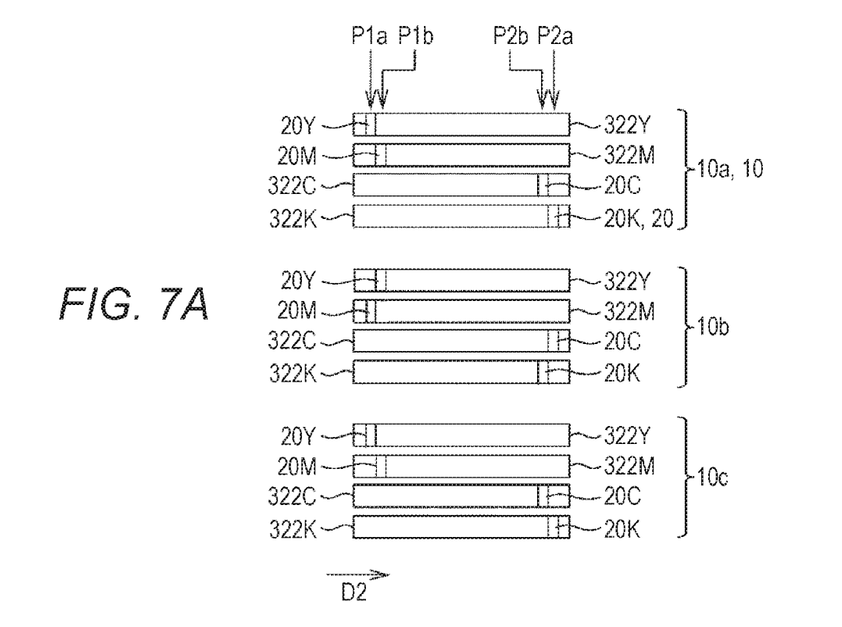
FIG. 7A and FIG. 7B are diagrams for illustrating third printing control for preventing the exposure memory on the photosensitive drum.
Figure 7B:
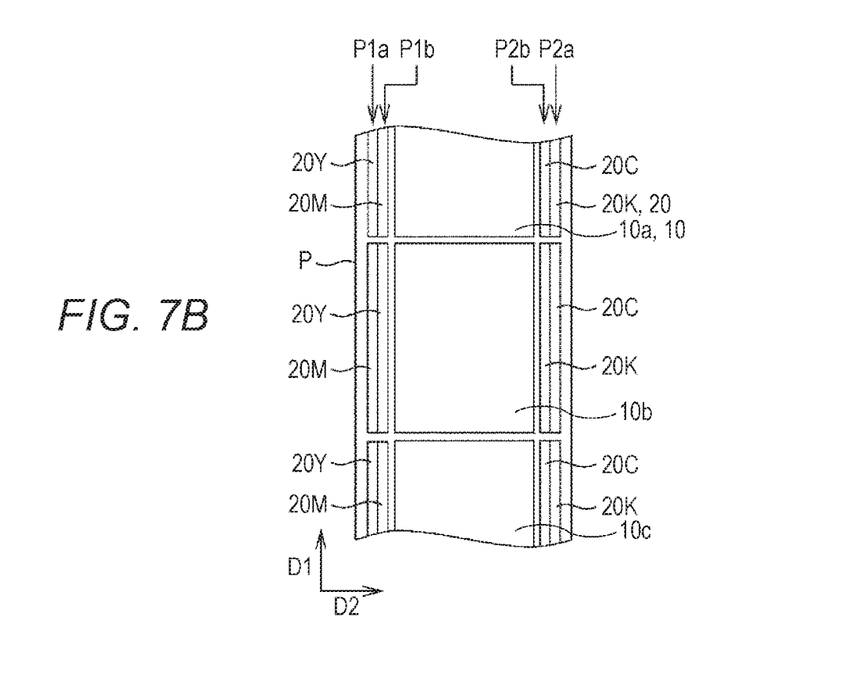

FIG. 7A and FIG. 7B are diagrams for illustrating third printing control for preventing the occurrence of the exposure memory on the photosensitive drums 322Y, 322M, 322C and 322K of the respective colors. Note that, in FIG. 7A, one end of the photosensitive drum 322 in the main scanning direction D2 is defined as end positions P1a and P1b from the outside, and the other end is defined as end positions P2a and P2b from the outside. Moreover, in FIG. 7B, the positions on the roll paper P corresponding to the end positions P1a and P1b of the photosensitive drum 322 are also defined as the end positions P1a and P1b from the outside, and the positions on the roll paper P corresponding to the end positions P2a and P2b of the photosensitive drum 322 are also defined as the end positions P2a and P2b from the outside.

In the third printing control, a toner discharge image 20 constituted by one layer is printed on the one end of the roll paper P in each of two rows when the coverage of the image to be printed is low, a toner discharge image 20 constituted by one layer is printed on the other end of the roll paper P in each of two rows, and the forming position of the toner discharge image 20 on the photosensitive drum 322 is switched at the timing when the printing page of an image 10 of a job is switched. More specifically, the third printing control is as follows.

First, the image forming processing of an image 10a of the first page is started. As shown in FIG. 7A, on each of the photosensitive drums 322Y, 322M, 322C and 322K, the image 10a (not shown) of the first page is developed in an image forming region between the end positions P1b and P2b. Furthermore, when the image coverage of the job to be executed is low, a toner discharge image 20Y is developed at the end position P1a on the photosensitive drum 322Y of the Y color. On the photosensitive drum 322M of the M color, a toner discharge image 20M is developed at the end position P1b. On the photosensitive drum 322C of the C color, a toner discharge image 20C is developed at the end position P2b. On the photosensitive drum 322K of the K color, a toner discharge image 20K is developed at the end position P2a.

Subsequently, as shown in FIG. 7B, the image 10a of the first page is printed on the roll paper P. Furthermore, a toner discharge image 20Y of the Y color constituted by one layer is printed at the end position P1a which is a non-image forming region of the roll paper P, and a toner discharge image 20M of the M color constituted by one layer is printed at the end position P1b adjacent thereto. A toner discharge image 20C of the C color constituted by one layer is printed at the end position P2b which is a non-image forming region of the roll paper P, and a toner discharge image 20K of the K color constituted by one layer is printed at the end position P2a adjacent thereto.

Next, the printing processing of an image 10b of the second page is started. As shown in FIG. 7A, on each of the photosensitive drums 322Y, 322M, 322C and 322K, the image 10b (not shown) of the second page is developed in an image forming region between the end positions P1b and P2b. Furthermore, on the photosensitive drum 322Y of the Y color, a toner discharge image 20Y is developed at the end position P1b different from the end position P1a in the case of the first page. On the photosensitive drum 322M of the M color, a toner discharge image 20M is developed at the end position P1a different from the end position P1b in the case of the first page. On the photosensitive drum 322C of the C color, a toner discharge image 20C is developed at the end position P2a different from the end position P2b in the case of the first page. On the photosensitive drum 322K of the K color, a toner discharge image 20K is developed at the end position P2b different from the end position P2a in the case of the first page.

Subsequently, as shown in FIG. 7B, the image 10b of the second page is printed on the roll paper P. Furthermore, a toner discharge image 20M of the M color constituted by one layer is printed at the end position P1a which is a non-image forming region of the roll paper P, and a toner discharge image 20Y of the Y color constituted by one layer is printed at the end position P1b adjacent thereto. A toner discharge image 20K of the K color constituted by one layer is printed at the end position P2b which is a non-image forming region of the roll paper P, and a toner discharge image 20C of the C color constituted by one layer is printed at the end position P2a adjacent thereto.

Next, the printing processing of an image 10c of the third page is started. As shown in FIG. 7A, on each of the photosensitive drums 322Y, 322M, 322C and 322K, the image 10c (not shown) of the third page is developed in an image forming region between the end positions P1b and P2b. Furthermore, on the photosensitive drum 322Y of the Y color, a toner discharge image 20Y is developed at the end position P1a different from the end position P1b in the case of the second page. On the photosensitive drum 322M of the M color, a toner discharge image 20M is developed at the end position P1*b* different from the end position P1*a* in the case of the second page. On the photosensitive drum 322C of the C color, a toner discharge image 20C is developed at the end position P2*b* different from the end position P2*a* in the case of the second page. On the photosensitive drum 322K of the K color, a toner discharge image 20K is developed at the end position P2*a* different from the end position P2*b* in the case of the second page.

Subsequently, as shown in FIG. 7B, the image 10*c* of the third page is printed on the roll paper P. Furthermore, a toner discharge image 20Y of the Y color constituted by one layer is printed at the end position P1*a* which is a non-image forming region of the roll paper P, and a toner discharge image 20M of the M color constituted by one layer is printed at the end position P1*b* adjacent thereto. A toner discharge image 20C of the C color constituted by one layer is printed at the end position P2*b* which is a non-image forming region of the roll paper P, and a toner discharge image 20K of the K color constituted by one layer is printed at the end position P2*a* adjacent thereto.

Note that the toner discharge image 20 can be constituted in three or more rows according to a blank region other than the image 10 although a case where the toner discharge image 20 is constituted in two rows has been described in the above example.

[About Fourth Printing Control]

Figure 8A:
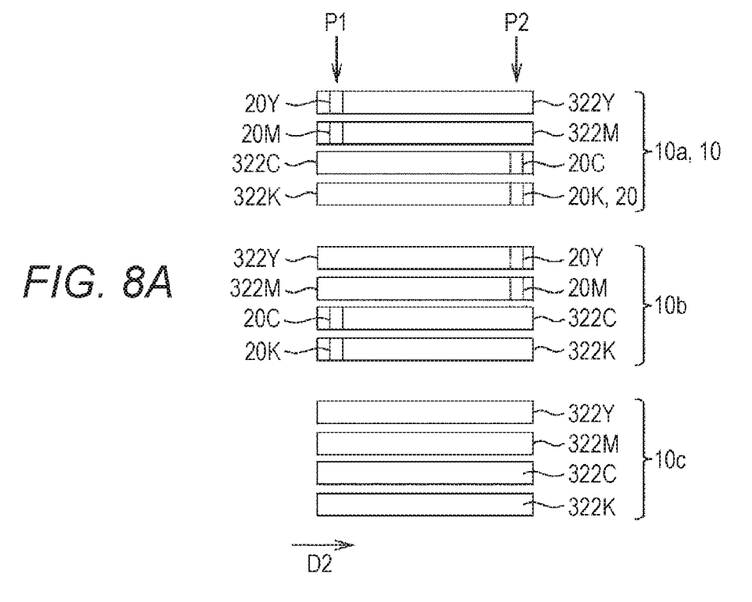
FIG. 8A and FIG. 8B are diagrams for illustrating fourth printing control for preventing the exposure memory on the photosensitive drum.
Figure 8B:
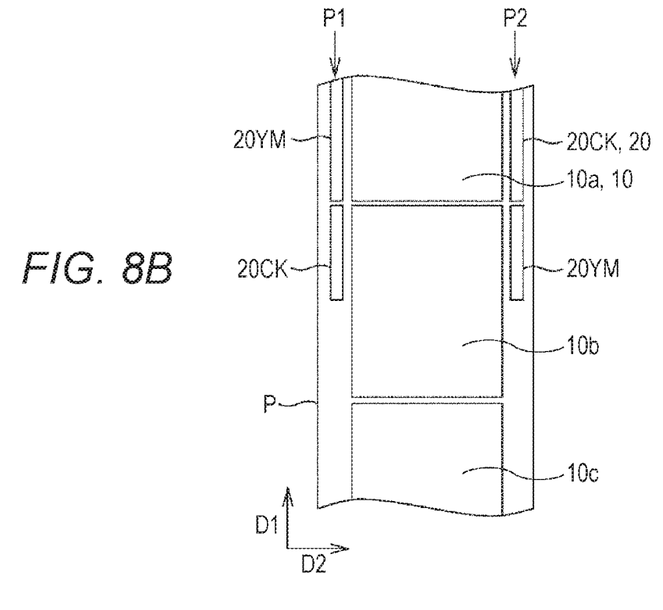

FIG. 8A and FIG. 8B are diagrams for illustrating fourth printing control for preventing the occurrence of the exposure memory on the photosensitive drums 322Y, 322M, 322C and 322K of the respective colors. Note that, in FIG. 8A, one end of the photosensitive drum 322 in the main scanning direction D2 is defined as an end position P1, and the other end is defined as an end position P2. Moreover, in FIG. 8B, the position on the roll paper P corresponding to the end position P1 of the photosensitive drum 322 is also defined as the end position P1, and the position on the roll paper P corresponding to the end position P2 of the photosensitive drum 322 is also defined as the end position P2.

In the fourth printing control, printing of a toner discharge image 20 is stopped even during a job once discharging of the total discharge amount of toner of a toner discharge image 20 is completed when the coverage of the image 10 is less than a specified value but the total discharge amount of the toner required is small. The total discharge amount of the toner of the toner discharge image 20 can be defined by information on at least one of the coverage of the image 10 based on the job and a printing distance. Since the specific processings are substantially the same as those in the aforementioned first printing control, only different points from the first printing control will be described.

As shown in FIG. 8A and FIG. 8B, when discharging of the total discharge amount of the toner of the toner discharge image 20 is completed at the time of printing the image 10*b* of the second page, printing of the toner discharge image 20CK printed at one end position P1 of the roll paper P and the toner discharge image 20YM printed at the other end position P2 on the roll paper P is stopped during the printing of the image 10*b* of the second page. Printing of the images 10*b*, 10*c* and so on based on the job continues.

[About Control Patterns of Toner Discharge Time]

Figure 9:
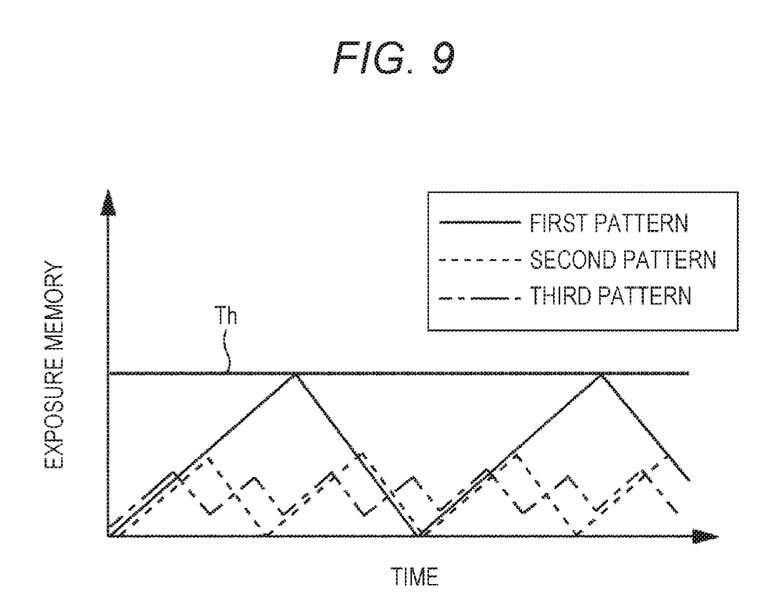
FIG. 9 is a diagram for illustrating control patterns of a toner discharge time with respect to the allowable limit value of the exposure memory.

FIG. 9 is a diagram for illustrating control patterns of a toner discharge time with respect to an allowable limit value Th of the exposure memory. In FIG. 9, the vertical axis represents the exposure memory (allowable amount), and the horizontal axis represents time. In the present control of the toner discharge time, the characteristic that the exposure memory attenuates with time at a constant rate in a state where the exposure processing is not performed on the photosensitive drum 322 is utilized.

As shown in FIG. 9, in a first pattern, the toner discharge image 20 is formed at a predetermined end position of the photosensitive drum 322, and the formation of the toner discharge image 20 on the photosensitive drum 322 is stopped at the timing immediately before the allowable limit value Th is reached at the end position of the photosensitive drum 322. After a predetermined time elapses and the allowable amount of the exposure memory on the photosensitive drum 322 attenuates after the stopping, the toner discharge image 20 is formed again at the same end position as before the photosensitive drum 322 is stopped.

In a second pattern and a third pattern, the toner discharge image 20 is formed at a predetermined end position of the photosensitive drum 322, and the formation of the toner discharge image 20 on the photosensitive drum 322 is stopped at the timing having a margin with respect to the allowable limit value Th. After a predetermined time elapses and the allowable amount of the exposure memory on the photosensitive drum 322 attenuates after the stopping, the toner discharge image 20 is formed again at the same end position as before the photosensitive drum 322 is stopped.

Operation Example of Image Forming System 100

Figure 10:
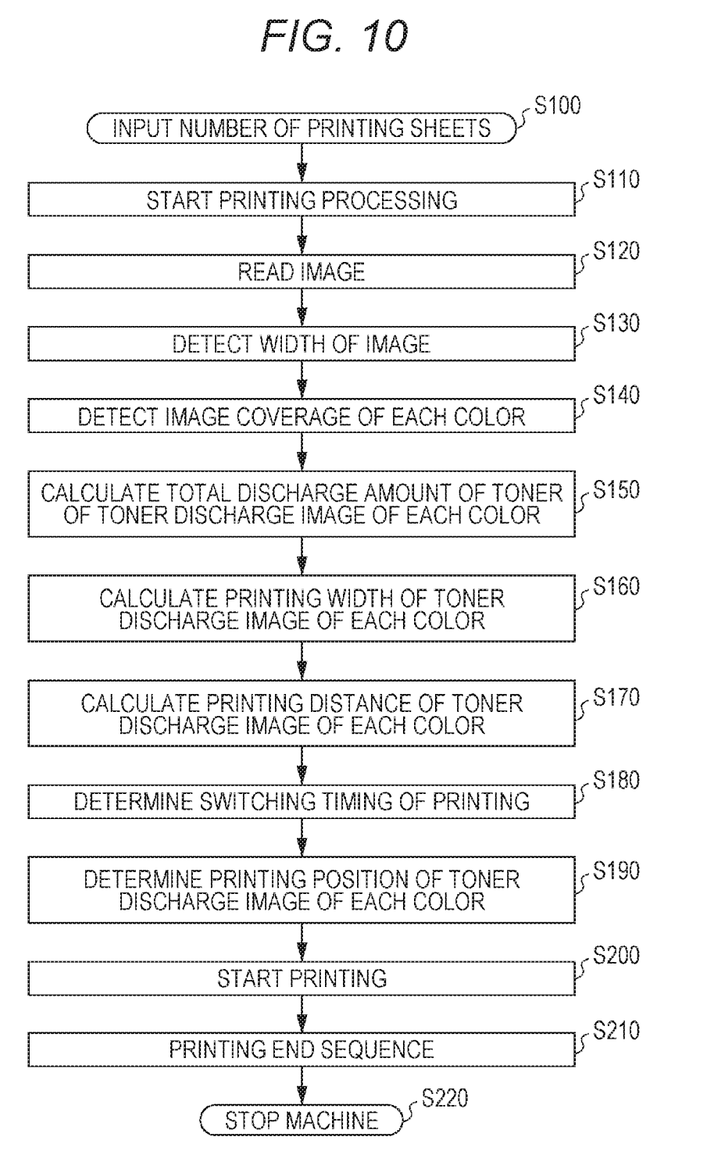
FIG. 10 is a flowchart showing an operation example of the image forming system in a case where a predetermined image is formed on roll paper.

FIG. 10 is a flowchart showing one example of the operation of the image forming system 100 in a case where a predetermined image is formed on the roll paper P.

As shown in FIG. 10, in step S100, image data of a job to be printed by a user, the number of printing sheets, and the like are inputted. Upon completion of step S100, the process proceeds to step S110.

In step S110, the controller 350 starts a predetermined printing processing for printing the image 10 in the job. Upon completion of step S110, the process proceeds to step S120.

In step S120, the controller 350 reads the image 10. For example, the inputted image is subjected to color conversion for each of Y, M, C and K colors, and image data of each color is acquired. Upon completion of step S120, the process proceeds to step S130.

In step S130, the controller 350 detects the length of the read image in the width direction D2. Upon completion of step S130, the process proceeds to step S140.

In step S140, the controller 350 detects (calculates) the coverage of each image data of each of Y, M, C and K colors. Upon completion of step S140, the process proceeds to step S150.

In step S150, the controller 350 calculates the total discharge amount of the toner discharge image 20 of each color from the detected coverage of the image data of each color. That is, the total discharge amount of the deteriorated toner in the developing portion that must be discharged is calculated. Upon completion of step S150, the process proceeds to step S160.

In step S160, the controller 350 calculates the printable length of the toner discharge image 20 in the width direction D2 based on the length of the normal image 10 based on the job in the width direction D2 in consideration of the blank regions provided on both sides of the image 10 in the width direction D2. Upon completion of step S160, the process proceeds to step S170.

In step S170, the controller 350 calculates the length of the toner discharge image 20 in the paper conveying direction D1 based on the length of the toner discharge image 20 in the width direction D2 and the total discharge amount of the toner discharge image 20. Upon completion of step S170, the process proceeds to step S180.

In step S180, the controller 350 determines a switching timing of the printing of the toner discharge image 20 on the roll paper P or the like based on the allowable limit value of the exposure memory on the photosensitive drum 322 of each color, the printing timing of the page of the image 10 and the like. Upon completion of step S180, the process proceeds to step S190.

In step S190, the controller 350 determines a printing position of the toner discharge image 20 of each color to be printed on the roll paper P based on the printing position of the image 10 based on the job on the roll paper P and the like. Upon completion of step S190, the process proceeds to step S200.

In step S200, the controller 350 starts the printing processing based on the job. More specifically, the controller 350 forms the normal image 10 in the image forming region substantially at the center of the photosensitive drum 322 of each color as well as forms the toner discharge image 20 in the non-image forming regions on both sides of the region, and prints both the image 10 and the toner discharge image 20 on the roll paper P through the intermediate transfer belt 324. Note that, for example, when the continuous printing distance of the job is 500 m, the toner discharge image 20 may be controlled to be printed on the roll paper P from the stage of 0 m, or the toner discharge image 20 may be controlled to be printed on the roll paper P at the time of exceeding 300 m. Upon completion of step S200, the process proceeds to step S210.

In step S210, the controller 350 executes the printing end sequence of the job. In the printing end sequence, for example, when all the total discharge amount of the toner discharge image 20 is not discharged, control to discharge the remaining toner is executed. In this case, since the transfer rollers of the secondary transfer portion 326 are spaced from the intermediate transfer belt 324, the remaining toner is transferred onto the intermediate transfer belt 324, and the toner transferred onto the intermediate transfer belt 324 is removed by the cleaning portion 328. Upon completion of step S210, the process proceeds to step S220.

In step S220, the controller 350 stops the operations of the machine when the printing end sequence is completed. In the present embodiment, such operations are repeatedly executed.

As described above, according to the present embodiment, the formation of the toner discharge image 20 on the photosensitive drum 322 is stopped (interrupted) before the exposure memory on the photosensitive drum 322 exceeds the allowable limit value Th. Thereafter, the forming position of the toner discharge image 20 on the photosensitive drum 322 is changed, or the toner discharge image 20 is formed at the same position as before the stopping after a certain period of time. Thus, the occurrence of the exposure memory on the photosensitive drum 322 can be prevented. This makes it possible to reliably prevent the occurrence of image defects.

Moreover, even when the printing region of the toner discharge image 20 on the roll paper P is narrowed and the toner density is increased, the occurrence of the exposure memory on the photosensitive drum 322 can be prevented so that the image forming region of the image 10 of a job can be widened. As a result, occurrence of wasted paper can be suppressed, and the costs can be reduced.

Furthermore, in a case where the printing of the toner discharge image 20 is unnecessary, such as a case where the image coverage is high, it is possible to eliminate the influence of the exposure memory even when the normal image 10 is printed into the printing region of the toner discharge image 20 or a mark for image alignment is printed by overprinting or the like. Thus, it is possible to prevent the influence on the normal image 10 and the alignment mark.

Note that the technical scope of the present invention is not limited to the above embodiments and includes various modifications to the above embodiments in a scope without departing from the gist of the present invention.

In the first to fourth printing controls and the control patterns of the toner discharge time described above, a case where the toner density of the toner discharge image 20 is set to be constant (100%) has been described, but the toner density is not limited thereto. For example, in the first printing control shown in FIG. 5A and FIG. 5B, the toner density of the toner discharge image 20 may be set to be low (e.g., 50%). Thus, it is possible to delay the generation timing of the exposure memory generated on the photosensitive drum 322. In this case, the forming position of the toner discharge image 20 on the photosensitive drum 322 may also be controlled to be switched in unit of several pages instead of in unit of one page of the image 10.

Moreover, in the above embodiments, an example of forming the toner discharge image 20 in a belt-like pattern has been described, but the toner discharge image 20 is not limited thereto. For example, the toner discharge image 20 may be constituted by a quadrangle (polygon), a circle or the like, which is not long. Furthermore, the printing position of the toner discharge image 20 is not limited to the end of the roll paper P. For example, when label images or the like are printed on the roll paper P, the toner discharge image 20 may be printed in a gap between these label images.

Further, as shown in FIG. 1, an example in which the present invention is applied to the image forming apparatus 300 that forms a color image has been described, but the present invention is not limited thereto and can be applied to an image forming apparatus that forms a monochrome image.

In addition, in the above embodiments, an example, in which the controller 350 of the image forming apparatus 300 mainly perform the image forming processing in conjunction with the controllers provided in the paper feeder 200 and the paper discharge apparatus 400, has been described, but the present invention is not limited thereto. For example, the controllers provided in the paper feeder 200 and the paper discharge apparatus 400 can mainly perform the image forming processing in conjunction with other controllers.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
   an image former that has an image carrier for supporting toner and prints a first image formed by exposure to the image carrier and a developing processing on continuous paper; and
   a hardware processor that controls the image former so as to print a second image on the continuous paper in a case where information on at least one of coverage and a printing distance of the first image formed by the image former meets a predetermined condition,
   wherein the hardware processor controls the image former so as to stop forming the second image on the image carrier before a toner amount of the second image per unit width at a predetermined position on the image carrier in a main scanning direction exceeds a threshold value affecting an exposure memory, and wherein the image carrier is provided for each of a plurality of colors; and wherein a second image for a first color of the plurality of colors is printed at a first location of the continuous paper corresponding to a first page of the first image, and a second image for a second color of the plurality of colors is printed at a second location of the continuous paper corresponding to a second page of the first image.

2. The image forming apparatus according to claim 1, wherein the threshold value is defined by an exposure amount per unit width x exposure time or toner density x the printing distance.

3. The image forming apparatus according to claim 1, wherein the exposure memory attenuates with time at a constant rate in a state where an exposure processing is not performed on the image carrier.

4. The image forming apparatus according to claim 1, wherein the hardware processor controls the image former so as to form the second image at a position different from a position on the image carrier on which the second image is formed before stopping when formation of the second image is restarted on the image carrier.

5. The image forming apparatus according to claim 1, wherein a total discharge amount of toner of the second image necessary for each job is defined by information on at least one of coverage and a printing distance of the first image.

6. The image forming apparatus according to claim 5, wherein the hardware processor controls the image former so that discharging of the total discharge amount of the toner of the second image is completed during the job.

7. The image forming apparatus according to claim 1, wherein the hardware processor controls the image former so as to stop forming the second image at the predetermined position on the image carrier and form the second image on the predetermined position of the image carrier on which the second image is formed before stopping after a certain period of time has elapsed.

8. The image forming apparatus according to claim 1, wherein the image carrier is provided for each of a plurality of colors, and the second image is constituted by a toner image with two or less layers developed by the image carrier with a number of two or less.

9. The image forming apparatus according to claim 1, wherein the toner amount of the second image is determined by a length of the second image in a conveying direction of the continuous paper, a length of the second image in a width direction orthogonal to the conveying direction, and density of the second image.

10. The image forming apparatus according to claim 1, wherein the hardware processor performs each unit printing of the first image with a timing of switching a position of the second image formed on the image carrier, a timing of stopping forming the second image on the image carrier, or a timing of restarting to form the second image on the image carrier.

11. The image forming apparatus according to claim 1, wherein the hardware processor prints the second image at an end of the continuous paper in a direction orthogonal to a conveying direction.

* * * * *